July 30, 1957
P. A. BANCEL
2,800,810
CRANKSHAFT
Filed July 7, 1954
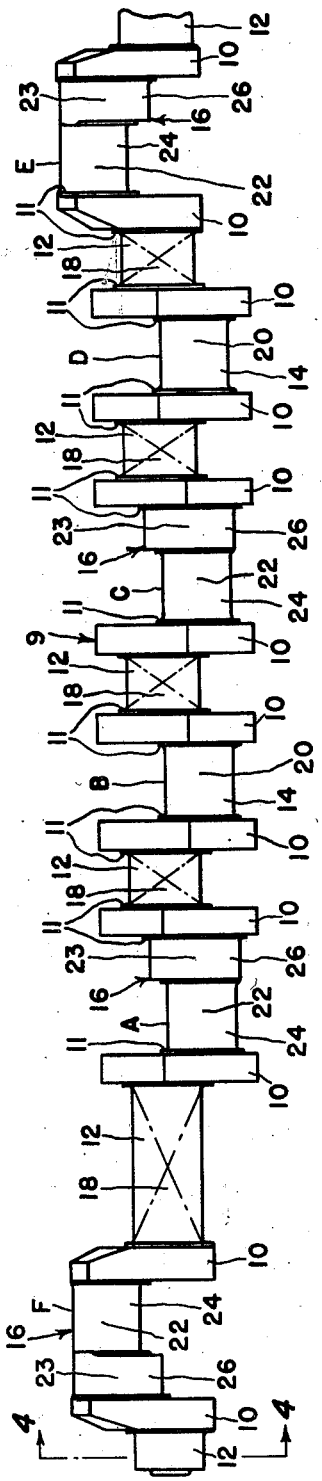
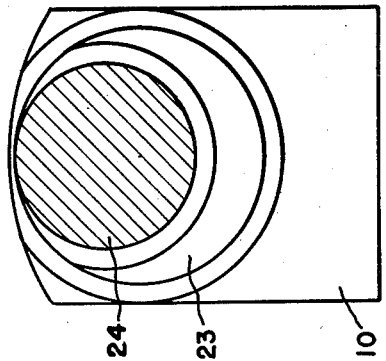
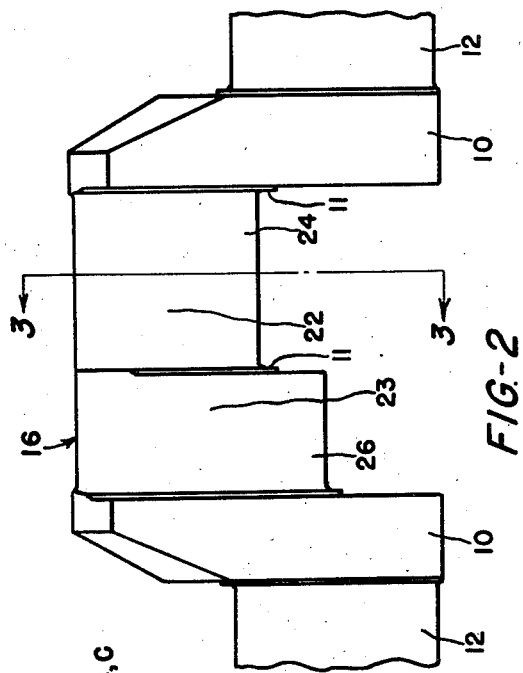
INVENTOR
PAUL A. BANCEL
BY
HIS ATTORNEY United States Patent Office 2,800,810
Patented July 30, 1957

2,800,810
CRANKSHAFT

Paul A. Bancel, Montclair, N. J., assignor to Ingersoll-Rand Company, New York, N. Y., a corporation of New Jersey Application July 7, 1954, Serial No. 441,832

8 Claims. (Cl. 74—596)

This invention relates to crank-shafts and more particularly to crank-shafts for a motor driven gas compressor unit in which there are motor pistons and compressor pistons connected to the same shaft.

A common design for a motor driven multi-bank compressor is to provide a separate motor unit and a separate compressor unit arranged in end to end relation with the motor shaft connected to rotate the compressor shaft. One difficulty associated with this design is that the length of the connected units is excessively long.

In an effort to overcome this difficulty attempts have been made to connect the motor pistons and the compressor pistons on the same shaft. For example, one design is the master-slave type rod in which the master rod is fixedly connected at one end to circular plates and the slave, or articulated, rods are pivotally connected thereto on pins between the marginal portions of the plates. Another crank shaft design is where the motor power pin is merely extended to provide a compressor pin on the same crank as the power pin and with the same throw.

These designs result in a shorter motor-compressor unit, but have certain inherent disadvantages. For example, in both instances because the crank throws are identical for both the motor pistons and the compressor pistons, both pistons move at substantially the same speed. However, the ideal speed for the compressor is normally considerably lower than that for the motor. Thus, any speed chosen for that unit is, at best, a compromise.

Moreover, although these crank shafts are shorter than the combined length of separate motor and compressor shafts, the length is greater than the separate motor shaft alone. This greater length decreases the torsional stiffness of the shaft, for any given shaft diameter, and thereby lowers the natural frequency of torsional vibration of the shaft. Inasmuch as the natural frequency of the shaft determines, in a large part, the rated operating speed of the motor, any lowering of the natural frequency of vibration of the shaft results in a lowering of the rated speed of the motor compressor unit.

More particularly, every crank shaft and connected dynamic parts (e. g., flywheel, counterweights, connecting rods, pistons) has at least one natural frequency of torsional vibration. This frequency can be raised or lowered by decreasing or increasing the length (and hence the torsional stiffness) of the shaft. The relation of rated speed of the motor to the natural frequency of vibration of the shaft is as follows. Each motor piston during each cycle applies forces to the shaft thereby setting up impressed vibrations in the shaft. These impressed vibrational forces may be resolved into several forces of different magnitudes and of different frequencies, or orders of harmonic components. In any given motor design only certain orders of the impressed vibrational forces are of sufficient magnitude to require consideration, and these become important only when one of the said orders of vibration coincides with one of the natural frequencies of vibration of the shaft. For example, in a six cylinder four stroke cycle in line engine, the 3d, 6th and 9th orders are important. Thus, if a natural frequency of vibration of the shaft is 1,920 vibrations per minute, then at 320 revolutions per minute of the shaft the 6th order of the impressed vibration will coincide, or be in resonance, with this natural frequency of vibration of the shaft and may lead to excessively high stresses in and failure of the shaft. Accordingly, the motor must not be rated to operate at a speed within approximately 10 to 20 percent of 320 R. P. M., and if other considerations—e. g., permissible bearing speed, inertia forces, type of installation, prohibit operating above 352 to 384 R. P. M., then the permissible rated maximum speed is limited to 256 to 288 R. P. M. Thus it is clear that the natural frequency of vibration of a crank shaft is an element of first consideration in the speed rating, and hence output, of a reciprocatory unit.

It is accordingly one object of this invention to increase the natural frequency of vibration of a combined motor and compressor shaft as compared to known shafts of this class and of the same length.

A second object is to provide a crank shaft in which a motor crank pin and a compressor crank pin are mounted on the the same crank webs but are of different throws.

Other advantages of this invention will become apparent from the following specification and drawings in which, Figure 1 is a longitudinal elevation of a crank shaft constructed in accordance with the practice of this invention, Fig. 2 is an enlarged view of a single crank of the shaft shown in Fig. 1, Fig. 3 is a cross-sectional view taken through Fig. 2 along the line 3—3 looking in the direction of the arrows, and Fig. 4 is a diagram showing the angular relation of the various cranks shown on the shaft in Fig. 1.

The crank shaft 9 shown by way of illustration in Fig. 1 is designed primarily for use in a motor-compressor installation in which a multi-cylinder motor is connected to drive a multi-bank compressor connected to the same shaft. The shaft 9 comprises a plurality of crank webs 10 arranged with their sides 11 in opposed spaced face relation, with journals 12 connected between some of the opposed sides 11 and simplex and duplex crank pins 14 and 16, respectively, connected between the other or remaining opposed sides 11.

The angular relation of the simplex and duplex pins 14 and 16 relative to each other is shown in Fig. 4, and for this purpose each pin is indicated by a letter (A—F) in Fig. 1. The spacing of the journals 12 and spacing and angular relation of the simplex and duplex pins 14 and 16 is dependent, in part, on the requirements of a particular installation, as, for example, the spacing requirements between successive compressor banks. Accordingly, it is to be understood that the arrangement shown is by way of illustration only.

It is to be noted that the center lines 18 of the journals 12 lie on a common axis and accordingly fix the center of rotation of the crank shaft 9. Each of the simplex pins 14 is of the same diameter for substantially its entire length and is mounted between a pair of webs 10 such that its center line 20 is out of line with the center lines 18 of the journals. The distance between the center lines 18 and 20 defines the throw of the crank and hence the stroke of a piston (not shown) connected to the simplex pin.

Each of the duplex crank pins 16 is of two diameters with different center lines. In the embodiment of the invention shown the center line 22 of the smaller diameter portion 24 of the pin 16 is displaced the same distance from the journal center line 18 as the simplex pin center line 20. This portion 24 of the duplex pin 16 is, like the simplex pin 14, adapted to be connected through suitable linkage to two pistons of the compressor driving motor (not shown), and has the same diameter as the pin 14.

The larger diameter portion 26 of the duplex pin 16 is adapted to be connected to a compressor piston of the motor compressor unit (not shown) and accordingly has its center line 23 located between the center lines 22 and 18 of the duplex pins 16 and journals 12, respectively. Thus the circle of rotation of pin portion 26 about the journal center line 18 is smaller in diameter than the circle of rotation of the simplex pin 14 and duplex pin portion 24 about the same axis. This means, of course, that stroke of pistons connected to the simplex pins 14 and the duplex pin portions 24 is greater than that of a piston connected to the duplex pin portion 26. Accordingly, when this shaft is used in a motor-compressor unit with the motor pistons connected to the pins 14 and the pin portions 24 and the compressor pistons connected to the pin portions 26, the linear velocity of the compressor pistons is lower than the linear velocity of the motor pistons for any given speed of the rotation of the shaft, a highly desirable advantage as was previously noted.

In furtherance of another object of this invention, the larger diameter portion 26 of the crank pin 16 is mounted adjacent a crank web 10. Also the larger diameter pin portion 26 is located relative to the pin portion 24 such that the periphery of the pin portion 24 does not extend beyond the periphery of the pin portion 26 at any point. In the form of the invention shown, longitudinal lines located on the peripheries of the pin portions 24 and 26 and most distant from the shaft axis 18 are in alignment and are parallel to the axis 18, or, in other words, these pin portions are in peripherial alignment at a point most distant from the axis 18. Thus the entire cross-section of the pin portion 24 is joined to the adjacent pin portion 26 thereby insuring maximum strength at this juncture.

Experiments have shown that the web supporting effect of the pin portion 26 greatly increases the stiffness of the shaft and thereby increases the natural frequency of vibration of the shaft. Indeed, a test on a relatively small model shaft having a pin portion 24 diameter of approximately 2.5 inches revealed that a crank with a duplex pin 16 is stiffer than a crank with a simplex pin 14 notwithstanding the fact that the duplex crank is longer in actual length than the simplex crank.

In this test one end of the model shaft was held immovable and a twisting force of two thousand pounds at a one foot radius was applied to the opposite end of the shaft, and the difference in arcs of movement of points at the longitudinal centers of the bearings on the opposite sides of a crank was measured. It was learned that the duplex crank, which had a length of 125% of a simplex crank, twisted, or had an arc of movement between these points of only 88% of the twisting movement of the simplex crank, under the same test conditions.

The comparative stiffness of these two cranks may also be expressed in terms of equivalent length of a cylindrical shaft of the same diameter as the smaller diameter portion 24 of the duplex crank. The duplex crank 16 measured 8.37 inches between journal center points and had the equivalent stiffness of an 8.19 inch straight shaft of the diameter stated, whereas a simplex crank measuring 6.68 inches between journal center points had only an equivalent stiffness of a straight shaft 9.42 inches long. In other words the duplex crank although 1.69 inches longer in actual length is 1.23 inches shorter in equivalent length than the simplex crank. Indeed, the duplex crank is stiffer than a straight shaft of the same actual length.

The importance of this may be readily appreciated when it is known that it is not uncommon for a full scale shaft embodying this invention to have an actual length of 20 feet or more. Such a shaft if used in a motor-compressor unit having, for example, 12 power pistons and arranged to drive four compressors, permits rating the unit to be operated 5% to 10% faster than a similar unit in which a master and slave type crank is used or a shaft where the compressor pin and power pin are of the same diameter and of the same throw. Moreover, with the duplex type crank the additional advantages of having a compressor piston speed of approximately 85% of the motor piston speed is obtained.

While I have shown and described a specific form of my invention, it is to be understood that various changes and modifications may be made without departing from the spirit of the invention as set forth in the appended claims.

I claim:

1. A crank shaft comprising a pair of crank webs in spaced face to face relation, journals connected to the outer sides of said webs and having longitudinal center lines on the same axis, and a crank pin having two diameters connected between said webs, the longitudinal center line of the larger diameter portion of the two diameter pin being between the longitudinal center line of the smaller diameter portion thereof and said center lines of the journals.

2. A crank shaft comprising, a plurality of crank webs with sides arranged in opposed spaced relation relative to each other, journals connected between some of the opposed sides of said webs and having longitudinal center lines on the same axis, crank pins between the other opposed sides, some of said pins being of two diameters with different longitudinal center lines.

3. A crank shaft as claimed in claim 2 in which the longitudinal center lines of the larger diameter portions of the two diameter pins is between the longitudinal center lines of the smaller diameter portion thereof and of the journals.

4. A crank shaft as claimed in claim 3 in which the circumference of said smaller diameter portions does not extend beyond the circumference of said larger diameter portion associated therewith.

5. A crank shaft for a motor-compressor unit comprising, a plurality of crank webs having sides arranged in opposed spaced relation to each other, journals connected between some of the opposed sides of said webs and having longitudinal center lines on the same axis, and simplex and duplex crank pins connected between the remaining opposed sides of said webs, the simplex pin being of the same diameter for substantially its entire length, the duplex pin being of two diameters with different longitudinal center lines.

6. A crank shaft as claimed in claim 5 in which the center line of the larger diameter portion of the duplex pin is positioned between the center line of the smaller diameter portion thereof and center lines of the journals.

7. A crank shaft as claimed in claim 6 in which the larger diameter portion of each duplex pin is located adjacent to one of the webs with which the pin is associated.

8. A crank shaft comprising a pair of crank webs in spaced relation, journals connected to the outer sides of said webs and having longitudinal center lines on the same axis, and a crank pin connected between said webs, said pin having one portion of substantially uniform diameter throughout its entire length and a second adjoining portion of larger diameter of substantially uniform diameter throughout its entire length, the longitudinal center line of the larger diameter portion being between the longitudinal center line of the smaller diameter portion and the axis of said journals, and in which both pin portions are in peripheral alignment at the surface line most distant from the axis of said journals.

References Cited in the file of this patent

UNITED STATES PATENTS

| | | |
|---|---|---|
| 1,860,607 | Causer | May 31, 1932 |
| 2,555,809 | Naab | June 5, 1951 |

FOREIGN PATENTS

| | | |
|---|---|---|
| 15,981 | Great Britain | of 1884 |
| 329,980 | Great Britain | May 28, 1930 |
| 602,203 | Great Britain | May 21, 1948 |